United States Patent [19]
Vos

[11] Patent Number: 5,477,879
[45] Date of Patent: Dec. 26, 1995

[54] CONTROL VALVES

[75] Inventor: Richard V. Vos, Northwold, South Africa

[73] Assignee: Prelude Pools Products C C, Randburg, South Africa

[21] Appl. No.: 208,281

[22] Filed: Mar. 10, 1994

[30] Foreign Application Priority Data

Mar. 10, 1993 [ZA] South Africa .......................... 93/1696

[51] Int. Cl.⁶ .............................. F16K 21/02; E04H 4/16
[52] U.S. Cl. .................... 137/513/5; 137/556.3; 4/490; 15/1.7; 210/169
[58] Field of Search ................ 137/513.5, 556.3; 4/490; 15/1.7; 210/169

[56] References Cited

U.S. PATENT DOCUMENTS

| | | | |
|---|---|---|---|
| 2,590,656 | 3/1952 | Schnebel | 137/536 |
| 2,731,299 | 1/1956 | Bramming | 137/513.5 X |
| 3,861,415 | 1/1975 | Larsen | 137/513.5 |
| 3,901,475 | 8/1975 | Dreibelbis | 137/513.5 X |
| 3,931,830 | 1/1976 | Gritz | 137/513.5 X |
| 4,317,243 | 3/1982 | Chauvier | 4/490 |
| 4,364,411 | 12/1982 | Payton et al. | 137/513.5 |
| 4,368,751 | 1/1983 | Chauvier | 137/98 |
| 4,570,660 | 2/1986 | Chauvier | 137/114 |
| 4,633,681 | 1/1987 | Webber | 137/513.5 X |
| 4,643,217 | 2/1987 | Frentzel | 137/112 |
| 4,683,599 | 8/1987 | Rief | 4/490 |
| 4,686,728 | 8/1987 | Rawlins | 15/1.7 |
| 4,742,593 | 5/1988 | Kallenbach | 15/1.7 |
| 4,790,344 | 12/1988 | Chauvier et al. | 137/112 |

*Primary Examiner*—John Rivell
*Attorney, Agent, or Firm*—Michael D. Bednarek; Marks & Murase

[57] ABSTRACT

A regulating control valve used with automatic pool cleaners in swimming pools is disclosed. A cap serves as a closure for the opening in a relief chamber and has a relief port therethrough. On the underside of the cap and surrounding the port there is a hollow boss which serves as a valve seating against which a relief valve within the chamber seals. There is a bleed opening between the cap and the relief valve which is permanently connected to the main water passage. The bleed passage is formed either by an eccentric enlargement to the port or by a cut out in the boss.

12 Claims, 5 Drawing Sheets

CONTROL VALVES

FIELD OF THE INVENTION

This invention relates to control valves and in particular to regulating control valves used with automatic pool cleaners in swimming pools.

BACKGROUND OF THE INVENTION

Automatic pool cleaners normally are connected to a source of suction through a flexible pipe that is in turn connected to a suction opening in the base of the pool weir or skimmer which is connected by suitable piping to a circulating pump for the pool. In order that the cleaner and the pipe are not subject to undue negative pressure during operation, the pipe is often connected to the piping through a regulating control valve.

There are a number of such regulating control valves which are known. Typical of such control valves are those described in U.S. Pat. No. 4,643,217; (Frentzel) issued to U.S. Pat. No. 4,368,751 (issued to Chauvier); U.S. Pat. No. 4,790,344 (issued to Chauvier et al) and U.S. Pat. No. 4,570,660 (issued to Chauvier).

This invention is concerned with a regulating control valve which is different to the foregoing and which comprises a main water passage having an inlet port and an outlet port; a relief chamber connected to the main water passage and having an opening remote from the passage; and a closure for the opening, the closure having a relief port therethrough, the surround (i.e., edge) of the relief port comprising a valve seating, and a relief valve within the chamber that is biassed to seat on the valve seating, the relief valve being connected to a surface subject to the suction pressure in the main passage so that when there is excessive suction in the main passage, the relief valve is drawn away from the valve seating against the bias to open the relief port. Such a control valve is hereinafter referred to as "a control valve of the kind set forth".

One widely used prior art control valve of the kind set forth will be described in detail below with reference to FIGS. 2 to 4. In this control valve, the relief valve will normally project at least partially through the relief port. Such a control valve of the kind set forth normally works very satisfactorily. It has been found, however, that when the swimming pool water contains a lot of leaves, these will tend to be caught between the relief valve and the valve seating, so that the relief valve is unable to move freely to relieve the high negative pressure in the main passage.

SUMMARY OF THE INVENTION

It has been found that by surrounding the relief port with a boss against which the relief valve can seat and then forming a cut out through the thickness of the boss, a cap will be provided with a permanent bleed passage. This bleed passage will extend between the valve and the cut out. By having a continuous bleed, the control valve is able to pass leaves and other large material that would otherwise block the control valve and seriously interfere with its operation as discussed above.

It has additionally been found that by using the cap on a conventional control valve, the advantages of the invention can be obtained with no other modification of the control valve.

It has further been found that the particular shape of the cut out provides for improved operation of the device.

Furthermore, it has been found that by making the upper surface of the cap round and toroidal, the chances of leaves hooking onto the upper surface of the cap are minimized. Consequently, the possibility of leaves building up on the upper surface of the control valve and then entering the valve opening in a mass which prevents the control valve operating properly is virtually eliminated.

According to one aspect of the invention there is provided a control valve of the kind set forth having a bleed passage between the valve seating and the relief valve which is permanently connected to the main water passage. The cross-sectional area of the bleed passage is quite substantial and may be from 10 to 50 mm$^2$, conveniently between 15 to 30 mm$^2$ and preferably between about 17.5 to 25 mm$^2$. The bleed passage is conveniently formed by enlarging the relief port. Yet again, the bleed passage may be formed in the relief valve. In a preferred control valve however the relief port is surrounded on the underside by a boss against which the relief valve seals, and an opening may be provided in the boss to provide the bleed passage.

The closure is normally a cap which is screwed onto the relief chamber and is arranged to be movable axially relative to the relief chamber thereby to vary the negative pressure in the main passage that will draw the relief valve off the valve seating.

According to another aspect of the invention there is provided a closure for a valve as described in the above paragraph shaped so that when the closure is applied to the relief chamber, a bleed passage will be formed to permit water flow through the closure.

Two embodiments of the invention will now be described by way of, example and an example of a known control valve of the invention will be described for purposes of illustration, the embodiments of the invention and the prior art example being shown in the accompanying drawings.

BRIEF DESCRIPTION OF THE DRAWINGS

FIG. 9 is a section through the valve of FIG. 7 on a complex line 9—9 at right angles to that on which FIG. 8 is taken.

DESCRIPTION OF PRIOR ART

Figure 1:
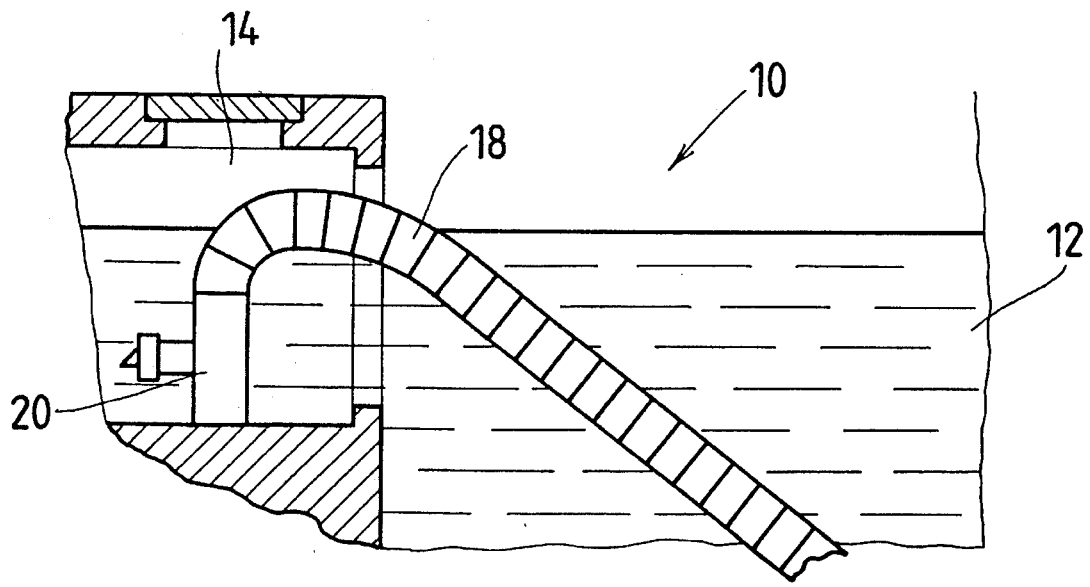
FIG. 1 is a detail section of a swimming pool showing a regulating control valve being connected in a weir.

Referring now to FIG. 1, there is shown a detail of a swimming pool 10 containing a body of water 12. The pool 10 has a conventional weir or skimmer 14 with a suction port (not shown) therein. This suction port is connected via pipes (not shown) to a circulating pump that draws water from the pool 10, circulates it through a filter and returns it to the pool at a location spaced from the weir 14. Within the pool 10 is an automatic pool cleaner (also not shown) such as that described in U.S. Pat. No. 4,742,593. The cleaner is connected to the suction port through flexible piping 18. The innermost section of the piping 18 is connected to a control valve 20 that enters the suction port.

Figure 2:
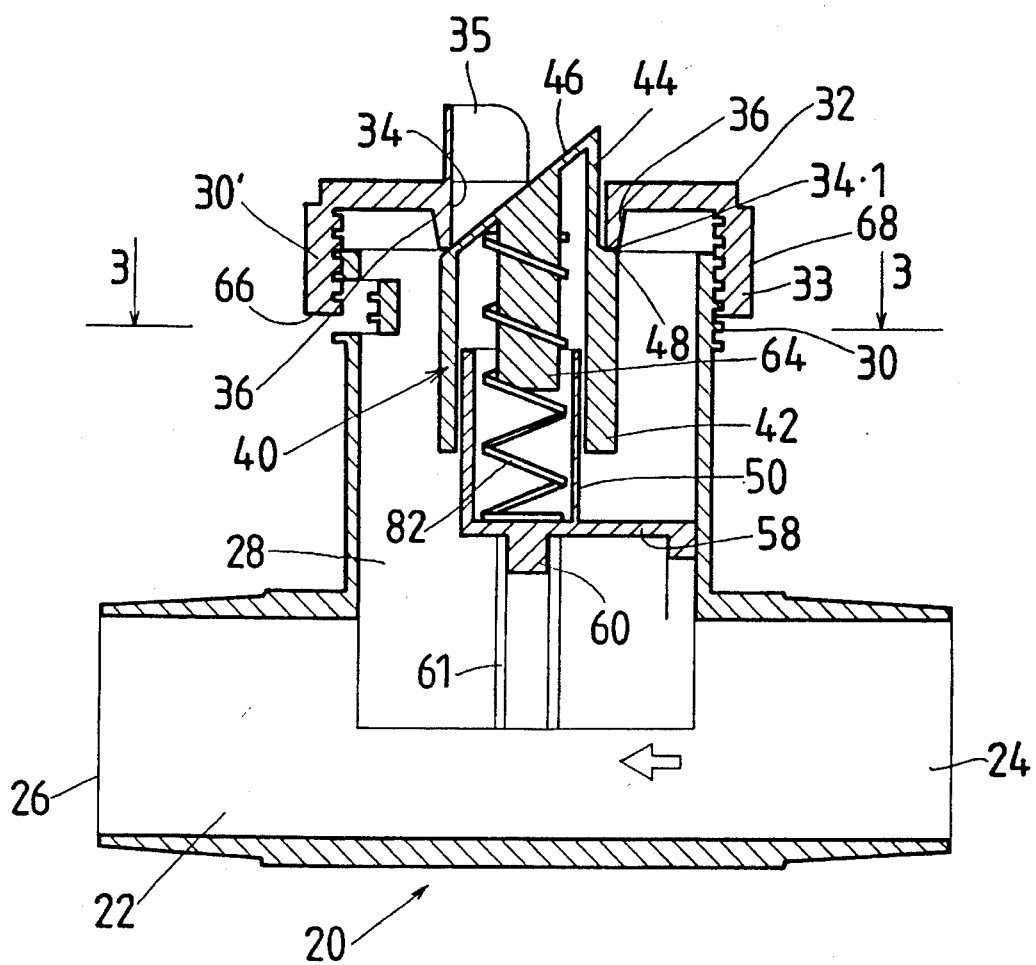
FIG. 2 is a longitudinal section through a known prior art control valve of the invention.
Figure 3:
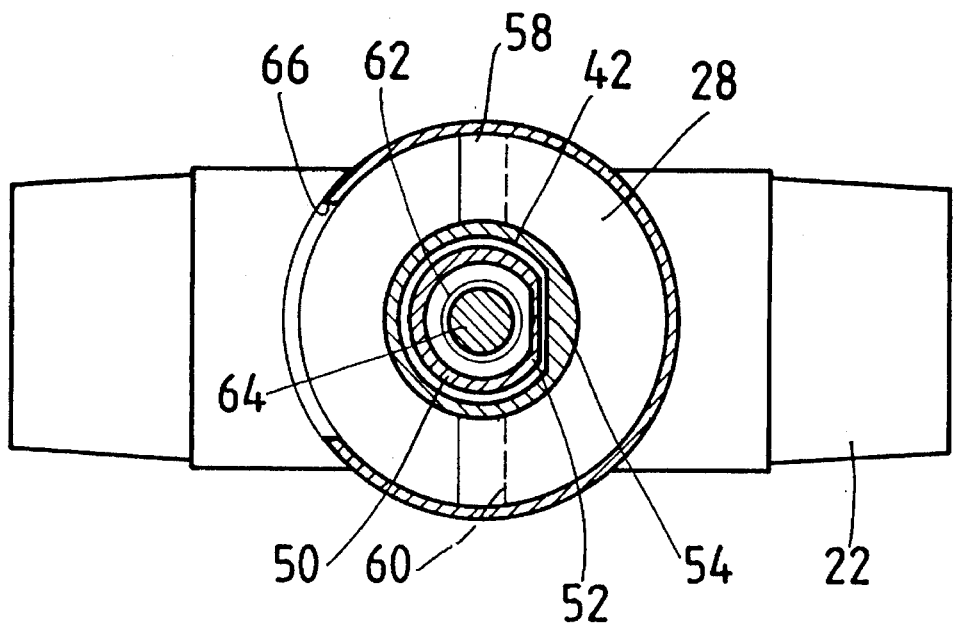
FIG. 3 is a section on line 3—3 of FIG. 2.
Figure 4:
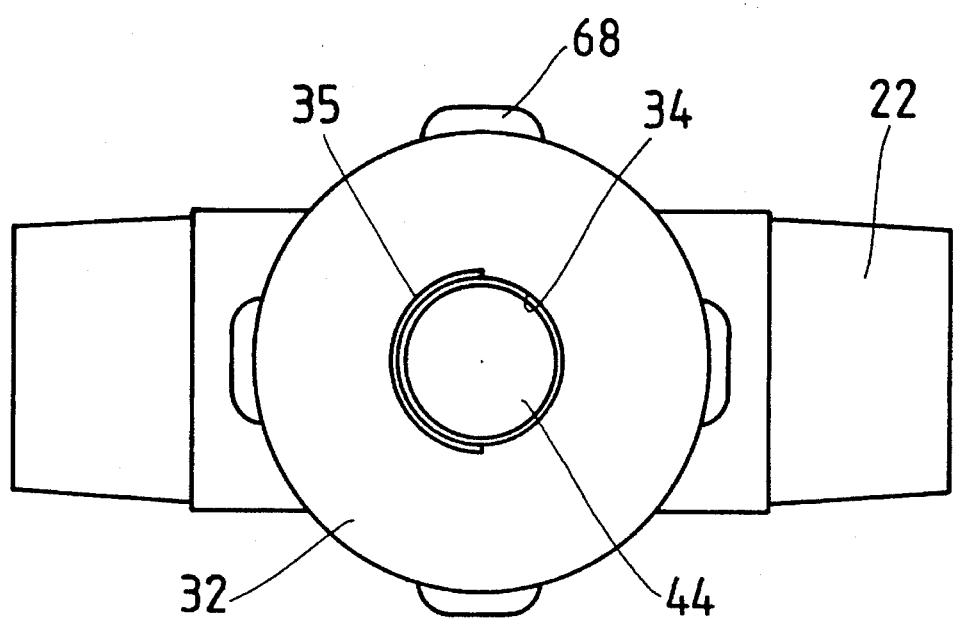
FIG. 4 is a side view of valve of FIG. 2.

The conventional control valve 20 is best shown in FIGS. 2 and 3. It comprises a main cylindrical through passage 22 having an inlet port 24 and an outlet port 26. A cylindrical relief chamber 28 of greater diameter than the passage 22 leads at right angles from the passage 22 between the ports 24 and 26. The end of the chamber 28 remote from the passage 22 is open. Externally the chamber has square section screw threads 30.

A closure cap 32 has a cylindrical skirt 33 depending from its outer periphery. The skirt 33 is threadedly screwed onto the end of the chamber 28. The cap 32 has a central circular section port 34 with an internal boss 36 therearound, the end face 34.1 of which comprises a valve seating. A coaxial, arcuate, low rim 35 is provided about the upstream side of the port 34.

A relief valve 40 is located within the chamber 28. This valve 40 comprises a cylindrical body 42 of 25.9 mm diameter with a projection 44 thereon which projects through the port 34. This projection 44 is in the shape of a cylinder of smaller diameter than the body 42 (20.8 mm) and of 26 mm axial length with an inclined face or guide surface 46 of 16 mm axial length. A conical step 48 of 2.6 mm axial height leads from the body 42 to the projection 44, the inclined face 46 commencing at the top end of the step 48. This step 48 can seal on the valve seating 34.1.

The body 42 is a sliding fit on a guide attached to the chamber 28. This guide comprises a substantially cylindrical part 50 having a chordal face 52 (see FIG. 3). The body 42 of the valve 40 has an internal enlargement 54 to engage this face 52 so that the body 42 is non-rotatably carried by the part 50. The bottom annular surface 54 of the body 42 as well as the interior of the valve 40 serve as pressure sensitive surfaces that are subject to the pressure of the water in the main chamber 28, which is the same as that in the passage 22.

The guide part 50 is mounted on a half circular plate 58 which is placed within the chamber 28 spaced from the passage 22 and the diametral face of which extends transversely to the direction of the passage 22. A diametral ridge 60 extends on the underside of the plate 58. The ends of the ridge 60 are located between pairs of ridges 61 formed integrally on the inside face of the chamber 28 to locate the guide part firmly in position.

The part 50 carries a spring 62 that fits around a co-axial internal part 64 of the valve 40 and acts against the valve 40 to bias it into a seating position in which the conical step 48 seals on the valve seating 34.1. In this position, the projection 44 extends through the port 24 with a narrow annular clearance.

A slot 66 extending normal to the axis of the chamber 28 is cut into the chamber 28 through the threads 30. This slot 66 is obturated by the skirt 33 of the cap 32 when in its fully homed position on the chamber 28 and is opened when the cap is released.

Projections 68 are provided on the skirt of the cap 32 in order for it to be more easily gripped for closing and opening.

In use, the cap 32 is rotated to adjust its axial position on the chamber thereby increasing or decreasing the force on the spring 62 to adjust the negative pressure at which the valve 40 will be drawn off the seating 34.1.

It has been found that the valve 20 works adequately. However, should there be any leaves floating on the surface of the water as happens in most pools, these will tend to be drawn by the water into the annular space around the projection 44, but even quite small leaves (say of not more than 30 mm length) will not enter the chamber 28. The leaves tend to accumulate and be packed between the conical surface 48 and the valve seating 34.1. This will increase the pressure on the spring so that the valve 40 will not open even though the negative pressure of the water in the passage 22 is greater than originally set. The provision of the slot 66 is an attempt to compensate for this blockage, but it has been found that this too tends to be easily blocked by leaves. Thus the control valve does not do the job it is supposed to do. The increased negative pressure of the water has a deleterious effect on the automatic pool cleaner and its performance. In particular it has a deleterious effect upon the diaphragm of an automatic pool cleaner described in the above mentioned patent specification.

DESCRIPTION OF THE FIRST EMBODIMENT OF THE INVENTION

Figure 5:
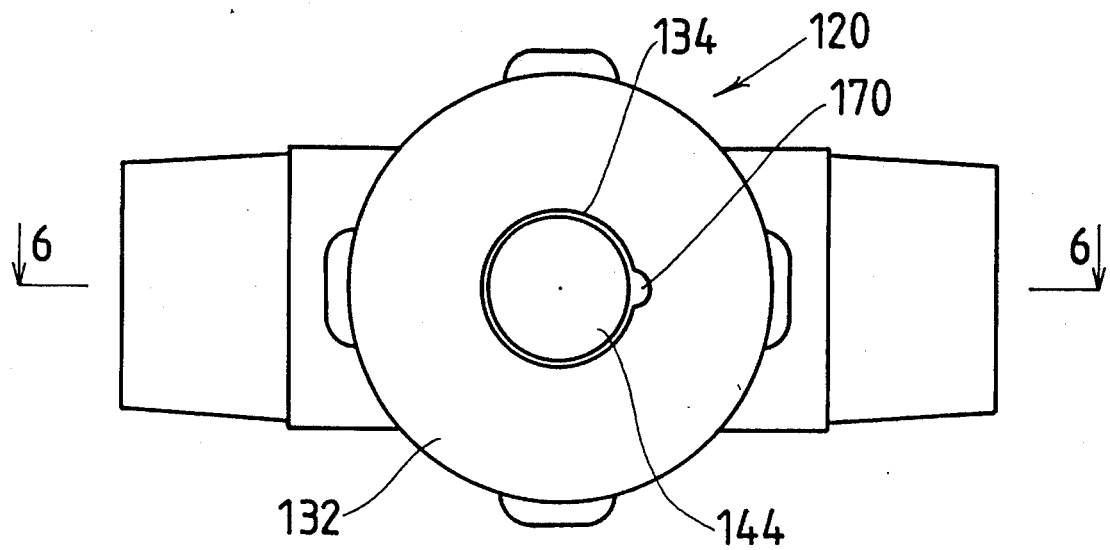
FIG. 5 is a view similar to FIG. 4 of a control valve of the invention.
Figure 6:
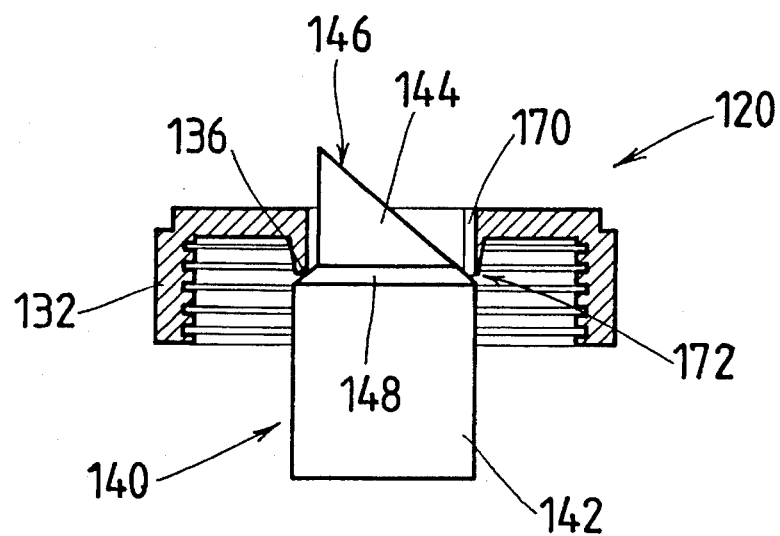
FIG. 6 is a detail section on line 6—6 of FIG. 5.

Reference is now made to FIGS. 5 and 6 wherein it is shown a control valve 120 of the invention. This valve 120 is identical to that described with reference to the preceding figures save that the cap 132 is modified. Accordingly all the items will have the same reference numerals applied thereto distinguished only by the addition of the prefix "1".

The aperture 134 in the cap 132 has an eccentric small enlargement 170. This enlargement 170 extends axially of the aperture 134 beyond the radius of the projection 144 of the valve 140 although not beyond the body 142. It also has the effect of cutting though the lower portion of the boss 136. Consequently there is a small permanently open bleed passage 172 that is provided between the valve 140 and the boss 136. In practice, the cap 132 should always be so located that the lower end of the surface 146 will be adjacent to the enlargement 170. The cross-section of the bleed passage is about 25 mm$^2$.

The upstanding rim 35 is omitted. All edges of the cap 132 are rounded so that leaves cannot hook on to the cap but will flow smoothly into the opening.

DESCRIPTION OF THE SECOND EMBODIMENT OF THE INVENTION

Figure 7:
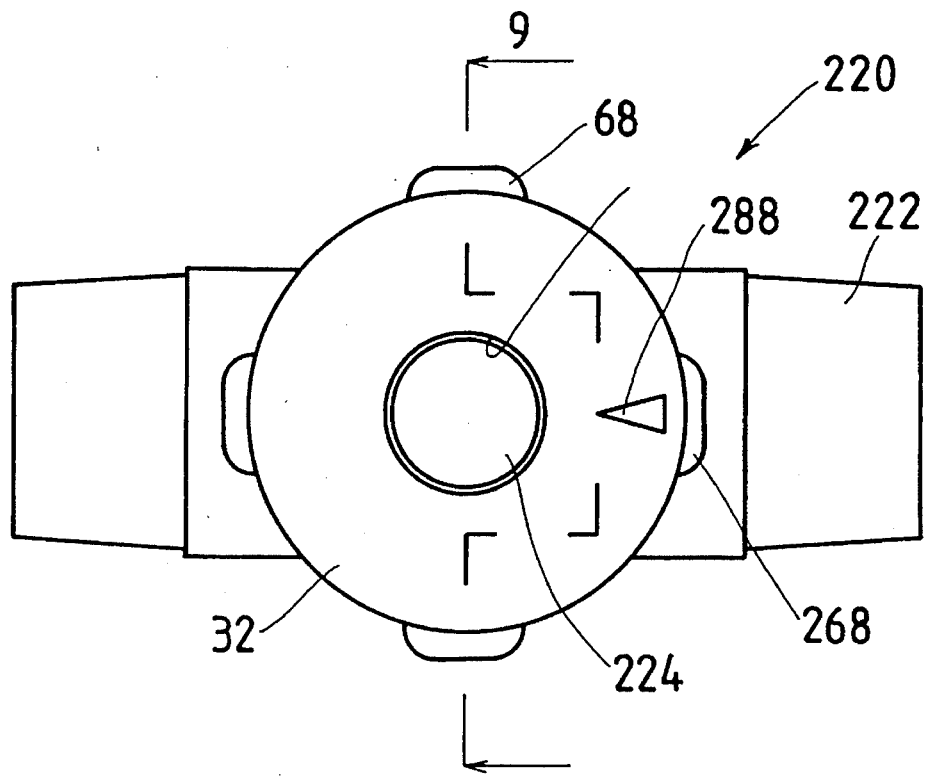
FIG. 7 is a view similar to FIG. 4 of a preferred embodiment of the invention.
Figure 8:
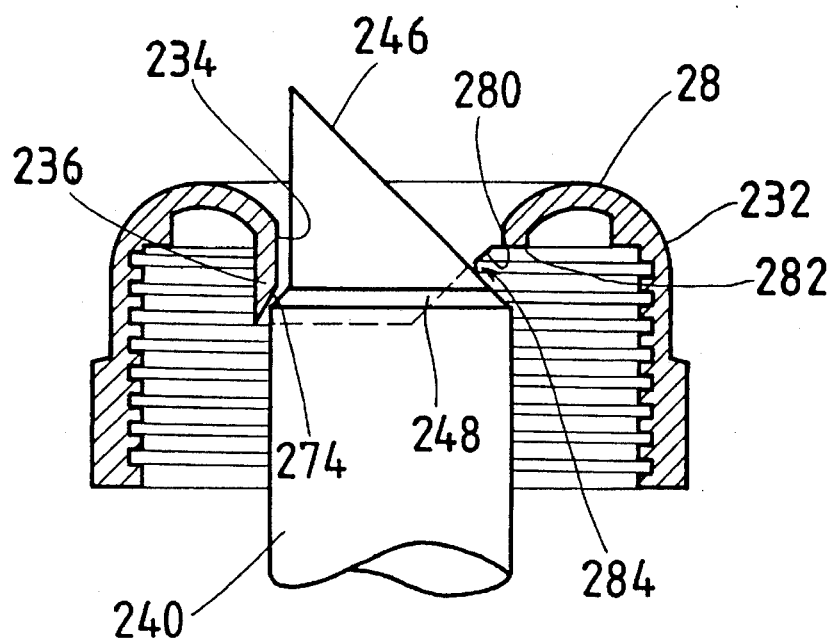
FIG. 8 is a detail section similar to FIG. 6 of a modified valve of the invention.
Figure 9:
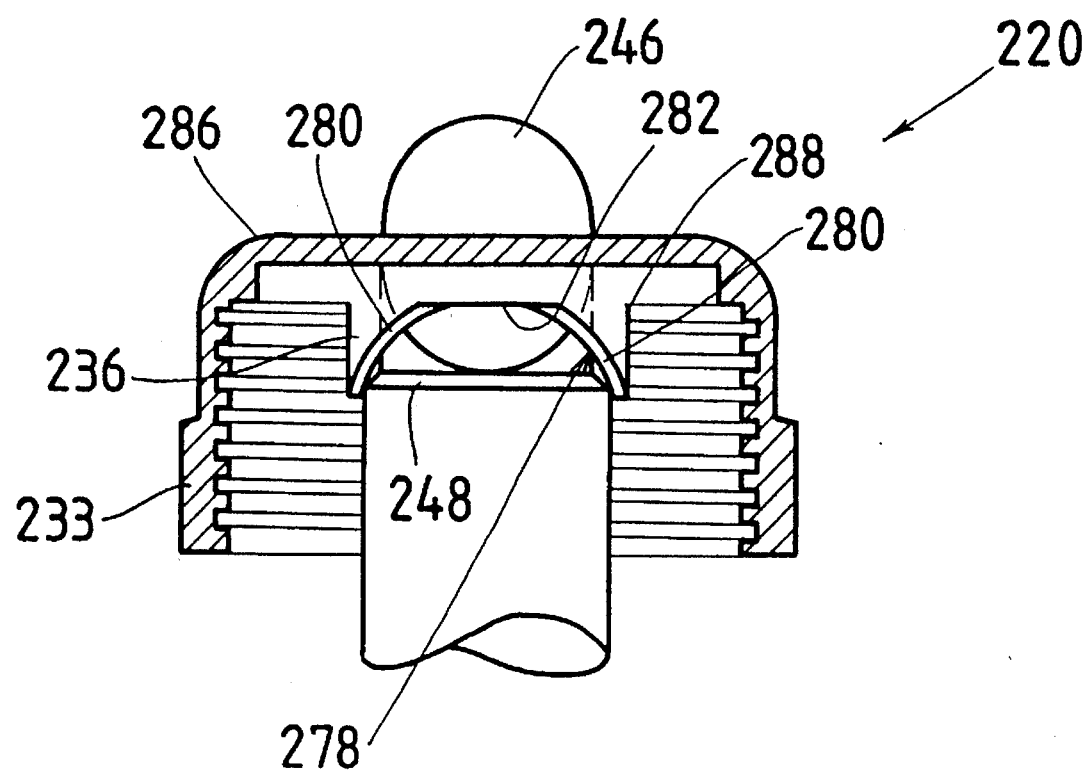

In the embodiment of FIGS. 7, 8 and 9, which is the currently preferred embodiment, the references are the same as those in FIG. 1 but with the prefix "2" added. Again the valve 220 is identical to the valve 20 save for the provision of a modified cap 232. The cap 232 is similar to cap 132 save as described below. First, the enlargement 170 to the port is omitted (i.e., port 234 is of circular section). The boss 236 is internally belled at 274 (see FIG. 8). This belled portion 274 provides a valve seating against which the conical step 248 seals.

The lower portion of the boss 236 has a cut-out 278 (best shown in FIGS. 8 and 9) in its periphery. This cut out 278 is formed by two inclined cuts 280 leading to a plateau 282 which lies in a plane radial to the axis of the skirt 233. Thus there will always be a bleed passage through the cut-out 278 and above the relief valve 240 when the conical step 248 seals against the interior of the boss 236. The conical step 248 engages the inside of the belled portion except at the cut-out 278. The portion not engaged by the surface 248 subtends an angle of 54° at the centre. The distance from the line of engagement to the plateau 282 is 3.75 mm and the width of the plateau is 9.00 mm. Therefore there is a permanent bleed orifice 284 which is always open, i.e., it is in permanent connection with the main water passage. This bleed orifice 284 is of approximately 24 mm$^2$ cross-section.

The top surface 286 of the cap 232 is in the form of half a toroid (i.e., it has two portions which are semi-circular in cross section) the control of which forms the passage 234. A marker 288 is provided on this surface 284 to indicate the location of the cut-out 278. In use the lowest part of the surface 246 must be opposite the cut out 278.

It has been found that, surprisingly, the provision of this bleed passage has the consequence that the packing of leaves between the valve and the valve seating does not take place. On the contrary, the control valves 120 and 220 of the invention are not affected by leaves of the normal size that may encounter the valves, leaves of up to 150 mm length comfortably passing through the openings 134 and 234. Thus the valves 120 and 220 will not be blocked as aforedescribed and will continue to operate controlling the negative pressure applied to the piping 18 and the automatic pool cleaner connected thereto. Furthermore it will now be unnecessary to provide the slot 66. The slot 66 may therefore be permanently obturated or the skirts 133 and 233 of the caps 132 and 232 may be elongated so as always to cover the slot irrespective of the location of the cap on the chamber.

The invention is not limited to the precise constructional details hereinbefore described and illustrated in the drawings. For example, a recess or slot may be provided in the periphery of the valve to form the bleed passage. Bleed passages may be provided in other swimming pool control valves.

Finally, it should be mentioned that considerable difficulty was experienced in measuring the cross-sectional areas of the bleed passages 172 and 284. The figures quoted are as accurate as possible, but were quoted only to give an indication of the order of such cross-sectional areas, not to limit the scope of the invention.

I claim:

1. A control valve comprising:
   a main water passage having an inlet port and an outlet port;
   a relief chamber connected to said passage and having an opening remote from the passage;
   a closure for the opening, the closure having:
     a main part with inside and outside surfaces, the inside surface being closer to the main water passage,
     a relief port through the main part;
     a boss located on the inside surface of the main part and surrounding the relief port, the boss being provided with a valve seating and a cut-out through a thickness of said boss to form a bleed valve, the cut-out extending from a free end of the boss to a position closer to the relief port;
   a relief valve within the chamber, said relief valve being biased to seat on the valve seating, there being a bleed passage formed between the relief valve and the cut-out which is permanently connected to the main water passage; and
   a surface connected to the relief valve, said surface being subject to the suction pressure in the main water passage so that when there is excessive suction in the main water passage, the relief valve is drawn away from the valve seating against the bias to open the relief port.

2. A control valve as claimed in claim 1, wherein the outside surface of the closure is formed as a part of a toroid, the opening through the toroid forming the relief port.

3. A control valve as claimed in claim 1, wherein the outside surface of the closure is formed as a half of a toroid, the opening through the toroid forming the relief port.

4. A closure for a control valve, comprising:
   a top surface having a port therethrough; and
   a hollow boss surrounding the port to serve as a valve seating in use, the boss being provided with a cut-out extending through a thickness of the boss to form a bleed valve.

5. A closure as claimed in claim 4, wherein said top surface is in the form of a part of a toroid, a central opening of said toroid forming said port.

6. A closure as claimed in claim 4, further comprising an internally threaded, cylindrical, peripheral skirt surrounding said top surface.

7. A closure as claimed in claim 6, wherein said hollow boss extends from said top surface by a lesser amount than said skirt.

8. A closure as claimed in claim 4, wherein the cut-out extends from the free end of the boss to part way along a length of the boss.

9. A closure for a control valve, comprising:
   a top surface having a port therethrough; and
   a hollow boss surrounding the port to serve as a valve seating in use, the boss being provided with a cut-out to form a bleed valve, said cut-out comprising a flat base surface lying in a plane radial of an axis of the boss and two inclined surfaces extending respectively from the ends of said base surface to the free end of the boss.

10. A closure for a control valve, comprising:
    a top surface having a port therethrough;
    a hollow boss surrounding the port to serve as a valve seating in use, the boss being provided with a cut-out to form a bleed valve; and
    an easily visible marking on said top surface aligned with said cut-out.

11. A control valve, comprising:
    a main water passage having an inlet port and an outlet port;
    a relief chamber connected to the said passage and having an opening remote from the passage;
    a closure for the opening, the closure having an upper surface and an inner surface, the outside surface of the closure being formed as a part of a toroid, a central opening extending through the closure forming a relief port through a top surface thereof, and a hollow boss surrounding the port on the inside surface to serve as a valve seating;
    a relief valve within the chamber, said relief valve being biased to seat on the valve seating; and
    a surface connected to the relief valve and being subject to the suction pressure in the main water passage so that when there is excessive suction in the main water passage, the relief valve is drawn away from the valve seating to open the relief port; and
    a cut out through the boss constituting a bleed passage formed between the valve seating and the relief valve, said bleed passage being permanently connected to the main water passage.

12. A closure for a control valve, comprising:
    a top surface in the form of a part of a toroid, a central opening of said toroid forming a port through the top surface, and a hollow boss surrounding the port to serve as a valve seating in use, the port being provided with a cut-out through the boss to form a bleed valve.

* * * * *